Feb. 3, 1970  B. A. LAMBERTON  3,492,823
METHOD AND APPARATUS FOR FORMING ELONGATED HARDENED
CONCRETE BODIES BY PRESSURE GROUTING
Filed March 30, 1967  4 Sheets-Sheet 1

INVENTOR.
BRUCE A. LAMBERTON
BY
Meyer, Tilberry & Body
ATTORNEYS

INVENTOR.
BRUCE A. LAMBERTON
BY
Meyer, Tilberry & Body
ATTORNEYS

Feb. 3, 1970 B. A. LAMBERTON 3,492,823
METHOD AND APPARATUS FOR FORMING ELONGATED HARDENED
CONCRETE BODIES BY PRESSURE GROUTING
Filed March 30, 1967 4 Sheets-Sheet 4

INVENTOR.
BRUCE A. LAMBERTON
BY
*Meyer, Tilberry & Body*
ATTORNEYS

United States Patent Office 3,492,823
Patented Feb. 3, 1970

3,492,823
METHOD AND APPARATUS FOR FORMING ELONGATED HARDENED CONCRETE BODIES BY PRESSURE GROUTING
Bruce A. Lamberton, Berea, Ohio, assignor to Construction Techniques, Inc., Cleveland, Ohio, a corporation of Delaware
Filed Mar. 30, 1967, Ser. No. 627,047
Int. Cl. E02d 5/38, 5/54; E21b 33/13
U.S. Cl. 61—35                    20 Claims

ABSTRACT OF THE DISCLOSURE

A flexible porous tube is positioned in any opening in the earth's surface. A high water cement ratio cementitious grout is pumped into the tube and pressure maintained until enough water has been pumped through the tube that the water-cement ratio is reduced to the point that the grout is no longer flowable.

---

This invention pertains to the art of forming concrete bodies and more particularly to method and apparatus for forming in situ hardened concrete bodies in much larger bodies such as in the earth's surface or in large concrete structures such as dams, piers or locks.

The invention is particularly applicable to the fastening of metallic tension members or tie rods in preformed openings below the earth's surface by encasing the member or rod in concrete and will be described with particular reference thereto although it will be appreciated that the invention has other and broader applications, for example, the formation of supporting concrete columns and other concrete bodies in cavities under the earth's surface. While the invention may also be applied to dams, concrete structures, piers and the like, for the purpose of simplicity, these will all be included generically within the intended meaning of the earth's surface, it being noted that the principal difference between the earth's surface and concrete structures is that the concrete structure is usually monolithic and rigid while the earth's surface may be a composite structure made up of packed layers or mixtures of clay, shale, rock, gravel or soil. In either event, the earth's surface or the concrete structure may have openings already existent therein, or formed in the practice of invention, which openings may be intersected by cracks or cavities which openings must have concrete bodies formed therein for various reasons, such as anchoring a tie rod, bracing, providing support for structures, blocking the flow of water or the like.

In the art of installing tension rods in the earth's surface, the practice heretofore has been to preform an elongated opening to a desired depth and of a diameter somewhat larger than the diameter of the rod to be employed. The rod is then inserted into the opening along with a grout pipe. A liquid cementitious group is then pumped under pressure through the grout pipe until the opening is filled, either completely or to the desired degree. Usually the grout pipe is progressively removed during this grouting operation. The grout is then allowed to harden into a concrete body with the concrete being in close frictional contact with the surface of the rod and with the surfaces of the preformed opening. Thereafter, means are fastened to the exposed end of the rod so that the rod can be placed in tension. These tension forces are transmitted from the rod to the hardened concrete and thence to the surfaces of the preformed opening.

Heretofore difficulty has been experienced in obtaining sufficient friction between the concrete and the walls of the opening such that the rod and its surrounding concrete body would move or loosen resulting in a failure of the installation.

A further problem has been that of obtaining, when using a highly liquid or pumpable grout, a hardened concrete having as high a compressive strength as concretes hardened from a mixture having a lower water-cement ratio and thus not pumpable.

Another problem has been that the earth's surface was either quite porous or had large cracks intersecting with the opening in which the concrete body was to be placed and during the pumping of the grout large amounts would flow into these cracks and be wasted. In some instances, the amount of grout to fill the cracks was more than that required to fill the preformed opening.

A still further problem has been in shoring up the roofs of underground cavities such as mine shafts, particularly when the cavity has become inaccessible due to cave-ins or the like.

A still further problem has been in forming concrete curtain walls in the earth's surface when the earth is porous, full of fissures, or the walls of the opening are of insufficient strength to remain intact when the grout is pumped.

All of these problems are further and most seriously aggravated by the pressure of either still or flowing water in the opening, in the cracks or as mud. The water further increased the water-cement ratio of the grout and lowered the strength obtainable using grouts.

The present invention contemplates a new and improved method and apparatus which overcomes all of the above difficulties and others and enables high compressive-strength concrete bodies to be readily formed in the earth's surface while employing a high water to cement ratio grout.

The present invention makes beneficial use of a phenomenon which has long plagued the field of pressure grouting, namely, that when it is attempted to fill cracks and voids below the earth's surface with concrete by using pressure to force a cementitious grout through the cracks and into the voids, the particles in the grout block up the cracks even though the cracks are of a width larger than the largest particle size in the grout and prevent the further movement of any particles through the cracks into the remote voids. Apparently two or more of the particles in attempting to go through a crack at the same time, bridge the crack, thus restricting its opening. Thereafter, smaller particles bridge this restricted opening in the same manner until very quickly even the cement particles having a size on the order of 1.0 micron will not pass through the opening. In effect, the various particles in the grout form a "filter bed" which prevents the further passage of any particles of any size. This filter bed effect takes place quite rapidly and once it starts, nothing can prevent its continuing. The filter bed, however, is not watertight and if the pressure is maintained, water continues to pass through such filter bed. Heretofore, the passage of the water into the voids beyond the filter bed without also carrying cement particles was considered quite detrimental.

The present invention uses this "filter bed" phenomenon to good advantage. Thus, it is known that the higher the water to cement ratio employed, the easier it is to pump the grout, particularly over long distances but that as the water-cement ratio increases the strength of the concrete decreases.

It is further known that a grout having a water-cement ratio below about 0.35 is almost non-flowable, or is a rigid mass having little if any strength but which hardens to an ultimate strength much greater than the grouts of the higher water-cement ratios.

It is also known that for most portland cements the water to cement ratio for maximum strength is about 0.25, which is the minimum required for complete hydration of the cement. A water-cement ratio in excess of 1.0 results in a concrete which is of little commercial value.

Thus, the present invention employs a closed fabric tube or form having pores or openings small enough so that a "filter bed" will form adjacent the inner surface of the tube when an easy to pump grout having a water to cement ratio in excess of 0.45, e.g. up to 0.65, or even more with Type III portland cement is attempted to be forced therethrough. When such a grout is pumped into such a tube, the grout particles try to flow through the pores. A very few get through, then they block up the pores. As the pumping is continued, a pressure builds up which tries to force additional particles through. Instead only water goes through leaving the particles associated therewith behind pressed against the particles already blocking the pores. The expressed water is continuously replaced by new grout and a thick layer of particles builds up which is squeezed against the form by the hydraulic pressure. This layer has a water-cement ratio which is so low that the grout is no longer flowable, that it is has set up. This layer, as it thickens and being non-flowable, transmits only a portion of the hydraulic pressure to the fabric so that the hydraulic pressures may be increased proportionately to a value above that which would normally rupture the fabric if the filter bed did not exist. This increased pressure causes more water to flow through the filter bed and further reduces the water-cement ratio on the inside of the tube.

The filter bed particularly close to the form has a water-cement ratio in the range of from 0.25 to 0.35 which will harden into a concrete of maximum strength. This water-cement ratio in some instances is a minimum at the surface adjacent the form increasing slightly inwardly such that there is a core of still flowable grout. Thus, an increasing water-cement ratio from the outer surface inwardly may result. This effect is more noticeable in large diameter forms where the total reduction in water-cement ratio will be less than in small diameter forms. A concrete body results which may be said to be case hardened, that is, it has maximum strength and density at the surface decreasing slightly toward the center.

In order to force the water through the filter bed and out of the tube, it is usually necessary in accordance with the invention that substantial ultimate pressures on the order of 15 to 100 p.s.i. be employed. These pressures, of course, exert an outward force on the walls of the tube which forces, even though limited by the strength of the filter bed, can create tension forces in the walls of the form possibly exceeding the bursting strength of many fabrics. It is, therefore, necessary when the diameter of the opening or cavity is greater than the tube diameter to use a fabric or reinforcements for the fabric which, taking into consideration the diameter of the tube and the pressures to be employed, will withstand the resultant tension forces. For the type and size of structures which the present invention contemplates, vegetable and animal fibers such as cotton or wool generally do not have sufficient strength and in all instances it is preferred to employ the synthetic high strength fibers such as nylon, Dacron, plastic-coated fiberglass or the like, and these fibers should be woven into a sheet or tube of a thread count and/or strand size to give the desired porosity and strength.

When using nylon, it is preferred to use what is known as a "producer bulked" nylon, i.e. the individual yarns of the fabric have randomly oriented continuous filaments extending outwardly from the surface of the fabric which becomes embedded in the grout and serve to bind the fabric to the hardened concrete.

The synthetics have further desirable characteristics over the natural fibers, namely, they are not wetted by the water of the grout and do not swell up to block the openings between strands. As such, they retain their strength and also aid in the formation of the filter bed. Further, nylon and similar materials have an inherent elasticity which is beneficially used to maintain the pressure on the thickened filter bed after the pumping has stopped. Also, under the tension forces the individual strands can slip relative to one another to align themselves into a mesh fabric with uniform size openings or pores. It is to be noted that the present invention employs a fabric having a substantial pore size relative to the cement particle size but that only an insignificant amount of the particles pass therethrough when the form is first filled while thereafter permitting free flow of water. The invention excludes what is commonly known as heavy cotton duck or canvas which are fabrics woven so tightly as to prevent or restrict the flow of water therethrough.

The pressures employed in the grouting must also take into consideration the pressure required to force the water in the grout outwardly through this filter bed and this pressure must be maintained until the desired amount of water has been forced out and the grout has set up. Tests have shown that cement which has set up under pressure in accordance with the invention has a higher density and a much higher four or seven day strength than the same cement which has set up not under pressure. The invention contemplates maintaining a pressure of from 15–75 pounds per square inch until such time as the cement has at least commenced to set up.

In accordance with the present invention where one or more spaced cavities in the earth's surface are to be shored up, a relatively small opening is formed in the earth's surface intersecting with the cavity or cavities. An elongated tube of flexible porous material closed at the lower or remote end and having an inflated diameter greater than the diameter of the opening is inserted in transverse collapsed condition through the opening into the cavity so that one end is adjacent to the surface of the cavity remote from the opening and the other end is at least in the opening. A cementitious grout is then pumped into the tube to fill and inflate it whereby the portion of the tube in the opening engages the walls of the opening and the portion in the cavity is inflated to the full diameter of the tube to form a supporting column with the ends of the column so formed pressing against the walls of the cavity.

Further in accordance with the invention, the tube encloses the end of an elongated generally stiff grout pipe so that the grout pipe may be used as a thrust member to force the tube through the opening into the cavity.

Further in accordance with the invention, the cementitious grout has a high water-cement ratio which is relatively easily pumped, e.g., in excess of 0.45, and the pumping of the grout is continued until at least a substantial amount of the water of the grout has passed outwardly through the pores of the form thus lowering the water-cement ratio of the grout remaining behind in the form so that it is set up and when this set up grout hardens it will be a concrete of maximum strength.

When the invention is to be used to install a tie rod in the earth's surface, an opening of a desired depth and of a predetermined transverse dimension is formed in the earth's surface. A tie rod of a desired length has its insertion end enclosed in an elongated form of flexible porous material sealed closed at both ends. The form has an inflated diameter greater than the transverse dimension of the opening and the combination of the tie rod and form is inserted into the opening. A cementitious grout is then pumped into the form until it is fully inflated and pressure bearing against the walls of the opening. The pumping is continued until a substantial portion of the water of the grout has passed outwardly through the pores of the form and the water-cement ratio of a layer of substantial thickness of the grout remaining behind has decreased to the point that it is no longer flowable, i.e. it has set up.

Further in accordance with the invention, particularly when the walls of the opening are formed of a relatively loose or soft material, the pressure of the grout in the form is raised to a sufficient amount to expand the walls of the opening outwardly resulting in a concrete body below the earth's surface of a bulbous form which will provide the maximum resistance against pulling out when the tie rod is placed under tension.

Still further in accordance with the invention, an arrangement is provided for installing a curtain wall in cavities in the surface to the desired depth of the wall. A plurality of elongated flexible porous fabric forms of a length equal to the desired height of the wall are placed in the opening and a cementitious grout is pumped into each of the forms until fully inflated with the walls of the forms when inflated being in side-by-side pressure engagement. The pressure is then maintained until substantial amounts of water in the grout have passed outwardly through the porous form and the water-cement ratio on the inside is substantially reduced.

It will be appreciated that, in all instances of the invention, if the transverse dimensions of the cavity are greater than the transverse dimensions of the flexible porous fabric form, then a plurality of such forms may be placed in side by side relationship such that when the forms are all inflated either simultaneously or sequentially, their sides will press one against the other.

Further in accordance with the invention, the hole in the earth's surface is formed by means of forcing a pipe into the earth's surface to the desired depth of the opening, such pipe having positioned in its inserting end the closed end of an elongated tube of porous fabric material, inserting the tie rod into the pipe to the desired depth of the tie rod, withdrawing the pipe a distance approximately equal to the length of the tube and such that the exposed end of the pipe is above the exposed end of the tie rod, pumping a cementitious grout through the pipe into the tube until the tube is filled and inflated against the wall of the hole left by the withdrawal of the pipe, continuing the pumping until enough of the water of the slurry has passed through the pores of the sock that the water-cement ratio of the grout, at least near the fabric, is reduced to between 0.25 and 0.35 and maintaining the pressure until the cement is set up and then allowing the cement to harden to a concrete.

"Grout" as used herein means any water suspension of solids in particulate form including a cementitious material and other materials ordinarily used with a cement and capable of being pumped through pipes or conduits for distances of from one to any number of feet required for the particular operation to be carried out. Such other materials may also include various substances for lubricating the particles so that they will slide more easily one over the other or for assisting in maintaining these particles in suspension. The other materials may also be sand or aggregate.

The cementitious material is usually portland cement having a particle size of from micron up to 0.005 inch which reacts either with other particles or with the water or both to form a solid.

Concrete as used herein is a hardened cementitious grout or cement whether or not sand or an aggregate is used.

Water-cement ratio as used herein is the ratio of the weight of the water to the weight of all cementing materials used in the grout. Pozzolans are normally considered equivalents to or substitutes for cement and when employed in the grout are considered a cementing material in calculating the water-cement ratio. Sand or aggregate may then be added to the mix in amounts that will not destroy the flowability or pumpability but this does not alter the water-cement ratio.

By porous is meant a material having openings or pores therethrough large enough to at least pass the liquid of the grout when under pressure but small enough to prevent the passage of essentially all of the solids. It will be appreciated that a pore opening may be larger than an individual solid particle and still prevent passage of a majority of such particles. In such instances, two or more particles, attempting to pass through the opening or pore at the same time bridge the opening effectively preventing further passage of solids but permitting passage of liquid.

Setting up as applied to a cementitious grout means where the water-cement ratio has been reduced sufficiently that the mixture has completely lost any flow characteristics but has little physical strength. The strength is obtained by the ultimate hydration of the cement particles. Setting up takes place as soon as the water-cement ratio is reduced as with the present invention. Hydration may take days or weeks to go to completion.

The principal object of the invention is the provision of a new and improved method of forming concrete bodies in the earth's surface which is simple to carry out, uses a minimum amount of grout and which provides a maximum strength concrete while using a high water-cement ratio grout.

Another object of the invention is the provision of a new and improved method of fastening tie rods in openings in the earth's surface using a pumped cementitious grout which grout when hardened has a maximum frictional engagement with the surface of the opening and a high strength.

Another object of the invention is the provision of a new and improved arrangement for installing tie rods in the earth's surface which enables the tie rod to be imbedded in a concrete member which member has a greater diameter remote from the actual surface of the earth.

Still another object of the invention is the provision of a new and improved arrangement for installing tie rods in the earth's surface wherein it is unnecessary to preform an opening and which can be done with a maximum speed and a minimum cost.

Still another object of the invention is the provision of a new and improved arrangement for plugging underground openings in the earth's surface which is simple, uses a minimum amount of grout, can be put in in minimum time, and gives a high strength concrete structure.

Still another object of the invention is the provision of a new and improved method of installing concrete bodies in the earth's surface which can be carried out in the presence of water, either still or flowing.

Still another object of the invention is the provision of a new and improved method of grouting concrete bodies in place in openings in the earth's surface where none of the grout is lost in fissures or voids intersecting with the opening.

Still another object of the invention is the provision of a new and improved method of pressure grouting concrete bodies in openings in the earth's surface which can be done under the most adverse conditions of water, fissures or other intersecting voids or cavities with the opening.

Still another object of the invention is the provision of a new and improved method of forming concrete supporting columns in underground cavities without the need of entering the cavity to install forms.

Still another object of the invention is the provision of a new and improved method of pressure grouting concrete bodies below the earth's surface using high water ratio pumpable cementitious grouts which concrete bodies will have a strength comparable to concrete bodies made from cement mixtures having ideal water-cement ratios.

The invention may take physical form in certain parts and arrangement of parts and certain steps and combination of steps, preferred embodiments of which will be described in this specification and illustrated in the accompanying drawings in sufficient detail to enable one skilled in the art to utilize the invention. The drawings being a part hereof and wherein.

Figure 1:
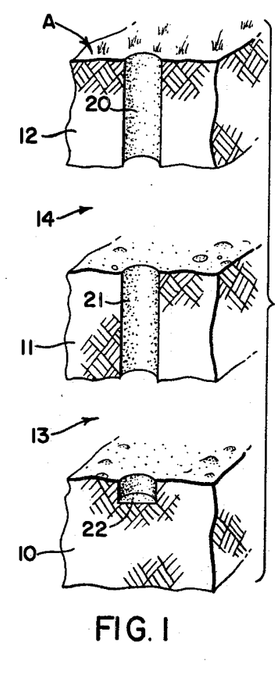
FIGURE 1 is a cross-sectional view of the earth's surface made up of a plurality of horizontal layers separated by horizontal voids or cavities in which concrete columns are to be installed and illustrating the first step of the invention.

Referring now to the drawings wherein the showings are for the purposes of illustrating preferred embodiments of the invention only and not for the purposes of limiting same, FIGURE 1 shows a fragmentary portion of the earth's surface A made up of solid earth base 10 and a plurality, in this case two (2) layers 11, 12 with the layer 11 separated from the base 10 by a horizontally extending void 13 and the layer 11 separated from the layer 12 by a horizontally extending void 14. It will be appreciated that the showing of the earth here is purely diagrammatic and the layers 11, 12 may be thicker or thinner than that shown and may be made of any kind of material, e.g. packed layers or mixtures of clay, shale, rock, gravel or soil, or may be of concrete. Also, while the layers 11, 12 are shown as extending horizontally, they can extend at any angle including vertical.

The voids or cavities 13, 14 are also shown diagrammatically and may have any height and any shape and in the same manner as the layers 11, 12 may extend at any angle including vertical. The important point is that the layers 11, 12 must be supported relative to each other and the base 10. Also, the voids or cavities 13, 14 can be filled with water or other loose material which is incapable of supporting weight.

In accordance with the invention, the first step is to drill a hole 20 transversely through the layer 12, then a hole 21 transversely to the layer 11, and then preferably a short hole 22 in the base 10. These holes are all aligned as shown on an axis through the cavities 13, 14. These holes may be of any diameter which is convenient. The smaller the hole the easier it is to drill or otherwise form. Thus, the diameter should be kept as small as possible, e.g. from two to four inches. However, the invention is not limited to any dimension.

Heretofore in order to shore up the layer 12 relative to the layer 11 and the layer 11 relative to the base 10, it was necessary to have access to the cavities 13, 14. In the alternative, grouting material would be poured into the cavities 13, 14 until a column was formed. This was usually quite wasteful because the grouting material would flow out horizontally under the force of gravity. Also, if water was present it was next to impossible.

Figure 2:
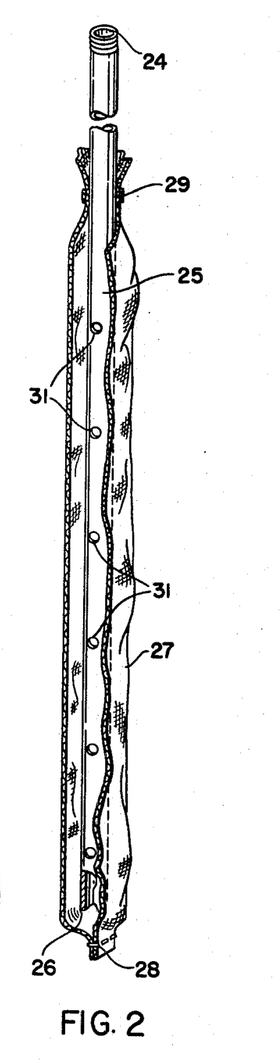
FIGURE 2 is a cross-sectional view partly in elevation of a grout pipe and flexible tubular form surrounding it to be used to form the columns.

In accordance with the invention, a pipe 25 is provided of a length to at least reach from the upper surface of layer 12 to a point close to and preferably in the bottom of the hole 22. This pipe has an insertion end 26 and an inlet end 24. The insertion end 26 of the pipe 25 is enclosed in a form 27 in the shape of an elongated tube of porous fabric material. This tube 27 is closed by any suitable means such as stitching, tying a rope, twisting a wire or the like as at 28 at the lower end where it extends beyond the insertion end 26 of the pipe 25.

The form 27 may be seamless or may be an elongated ribbon of fabric material stitched longitudinally. In accordance with the invention, the form 27 must have an inflated diameter greater than the diameters of the holes 20, 21 and 22.

At a point spaced substantially from the insertion end 26, the upper end of the form 27 is tied tightly around the outer surface of the pipe 25 as at 29 by any suitable means such as a rope, wire, clamp or the like. Alternatively, this upper end may be left open and secured at a fixed elevation, as by attaching to the ground A surrounding pipe 25.

The pipe 25 may be of rubber and flexible but preferably is of metal and rigid to facilitate guiding its entry through the holes in the earth. The pipe may be made in one or a plurality of sections.

Between the point 29 and the insertion end 26 where the form 27 is tied to the pipe, the pipe 25 is provided with a plurality of openings 31 of a size such that whatever material is pumped into the pipe 25 will flow freely therethrough. Thus, if the grout is to be a slurry having a maximum particle size of 1/16 inch, these holes should be at least eight times this diameter. The number of holes 31 form no part of the present invention, their only purpose being to allow grout when it is pumped to flow freely therethrough into the space between the form 27 and the outer surface of the pipe 25. It is to be noted that pipe 25 performs a dual function; namely, of allowing grout to be pumped to the entire inner length of the form 27 and also as a guide to enable the form 27 to be inserted through the aligned holes 20, 21, 22.

Thus, the pipe 25 with the form 27 affixed thereto as is shown in FIGURE 2 is inserted lengthwise through hole 20, through cavity 14, through hole 21, through cavity 13, and preferably the lower end or insertion end 26 of the pipe 25 will be grounded or based in the bottom of hole 22.

Following this insertion, the upper end 24 of the pipe 25 is connected to a source of a cementitious grout under pressure as is conventional. This grout may have a number of different formulations but in the preferred embodiment has the following formulation:

Portland cement: 2 cubic feet or 188 pounds.

Pozzolans in the form of fly ash: 1 cubic foot or 75 pounds.

Sand: 3 cubic feet or 330 pounds.

Water: 15 gallons or 125 pounds.

Intrusion aid: Manufactured by Concrete Chemicals Co.: 1 sack or 2⅝ pounds.

It will be appreciated that in the trade pozzolans are considered as a cementitious material. If the pozzolans are omitted, then an equivalent amount of portland cement should be added. It is known that it is possible to substitute from 15–50% of pozzolans for the portland cement without adversely affecting the qualities of the hardened concrete.

Intrusion aid contains small amounts of an aluminum powder which react with the cement as it hardens to produce minute quantities of gas which result in an expansion action to counteract the normal contracting action of the portland cement as it hardens. The Intrusion aid also contains other ingredients for assisting and maintaining the flow characteristics of the grout as it is pumped over long distances and also for helping maintain the particles in suspension.

A grout as above described has a water-cement ratio based on weight of approximately 0.475. Such a grout in the absence of accelerators will normally require approximately 24 hours to set up. Also, such a grout has a seven day strength of approximately 4400 pounds per square inch.

As will appear, this high water-cement ratio is not detrimental because using the invention the excess water is bled off through the walls of the form leaving a much lower and quicker-setting water-cement ratio. In fact, using the invention a four and seven day strength of 10,125 and 11,125 pounds per square inch, respectively, have been obtained.

The grout is pumped downwardly through pipe 25 and flows outwardly through the holes 31 into the space between pipe 25 and the tube 27. A primary requirement of the invention is that the tube 27 be porous to a degree to readily pass water but the pores must be small enough that the particles of the grout will block up the pores and will not pass therethrough except before the filter bed forms. Thus, the form 27 is preferably made of a bulked nylon fabric having a 23 by 21 thread count, 840 denier, single ply, plain weave. Such a fabric has rather large pore openings of approximately 1/32 inch and tensile strengths of 393 by 321 pounds per lined inch, respectively.

Figure 3:
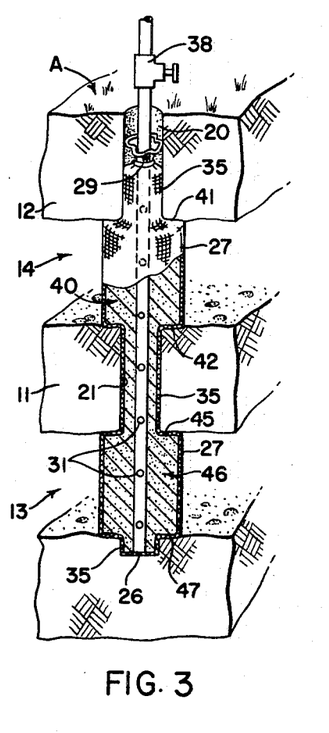
FIGURE 3 is a view similar to FIGURE 1 but showing the concrete columns in place.

As the grout flows into the space next to the form 27, the form inflates until full. The particles of the grout immediately block up the pores of the form. The pumping is continued and a pressure builds up which fully expands the form as is shown in FIGURE 3. The pressure is allowed to build up slowly with the result that water is forced outwardly through the pores of the fabric leaving behind a rapidly thickening filter bed which quickly becomes semi-rigid and thereafter tends to limit or restrict the amount of hydraulic force transmitted to the fabric. The pressure is allowed to increase to about 50 pounds per square inch and held at this value for a period of approximaetly 10 minutes. Obviously, any pressure sufficient to force the water through the pores of the form will suffice and pressures from 15 to 100 pounds have been found adequate. Thus, in some instances the upper end of the tube may be left open, particularly with long tubes or deep holes. The hydraulic pressure at the lower end is sufficient to force the water through the pores of the form at least at the lower end where the high strength is needed.

The walls of the form are forced into tight pressure and frictional engagement as at 35 with the walls of holes 20, 21 and 22 with a force proportional to the pressure. In the cavities 13, 14, however, the form 27 is free to expand and is inflated to its full diameter and the fabric is put under a substantial tension. For this reason the material used to make up the form 27 should have sufficient strength to withstand these tensile forces.

After approximately 10 minutes, the grout has set up. Valve 38 fastened to the upper end 27 of the grout pipe 25 is then closed and the grout pump may be disconnected. At this point, tension forces developed by the resilience of the fibers in the fabric making up the form 27 tend to hold the set up cement or grout in compression and when the cement finally hardens into concrete, a concrete of maximum strength results.

It will be noted that the diameter of the tube 27 is greater than the diameter of the holes 20 and that a column 40 of concrete is formed which bears at its upper end 41 against the lower surface of layer 12 and at its lower end 42 against the upper surface of the layer 11. Thus, the weight of layer 12 is transmitted through the concrete column 40 to the layer 11. In a like manner, the weight of the layer 11 rests on the upper end 45 of the concrete column 46 formed in the cavity 13 and the lower end 47 bears against the upper surface of the base layer 10. The weight of the layer 11 is thus transmitted through column 46 to the base layer 10.

If desired, the grout pipe 25 can be removed or allowed to remain in place. If it is to be removed, then preferably the pipe will have been coated with a material to prevent it from adhering to the hardened concrete. Also, before the cement has fully hardened the pipe 25 should be rotated to break the adhesion of the small amount of set up cement extending into the openings 31.

It will also be appreciated that the supporting columns 40, 46 can be formed even though the cavities 13, 14 are filled with either still or running water or if the cavities 13, 14 are filled with a mud or slurry. In such event, the form 27 will prevent the water in the cavities 13, 14 from intermingling with the pumped grout and regardless of the amount of water present, the water-cement ratio of the pumped grout can be reduced to the desired amount and held this way until the cement has set up and hardened into concrete.

This operation may be repeated at a plurality of spaced locations to provide a plurality of supporting columns. Alternatively, the operation may be repeated on axes spaced slightly less than the diameter of the inflated form and on a line such as to construct a curtain wall in the cavity. By spacing the axes at distances less than the diameter of the forms, the sides of the columns will be in pressure engagement.

Figure 4:
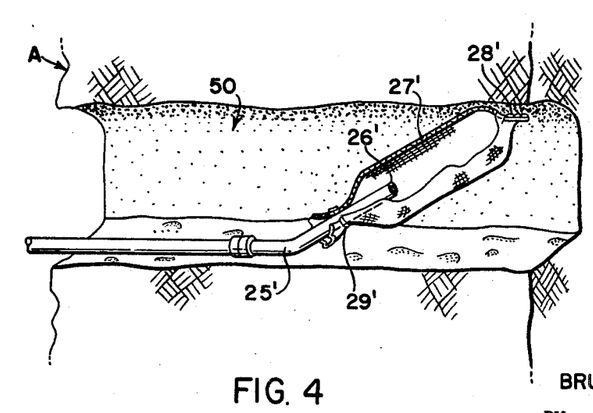
FIGURE 4 is a cross-sectional view of the earth's surface having a hole which must be blocked and showing an alternative form of the invention.
Figure 5:
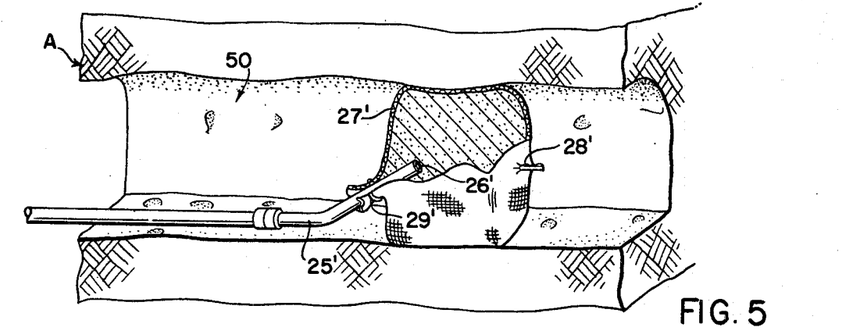
FIGURE 5 is a view similar to FIGURE 4 but showing the form inflated with concrete.

FIGURES 4 and 5 show an alternative embodiment of the invention employed to plug up an elongated opening such as a pipe or tunnel 50 in the surface of the earth. In this embodiment of the invention a grout pipe 25' is provided and a form 27' is fastened to the grout pipe as at 29' at a point spaced from the insertion or discharge end 26' of the grout pipe 25'. This form 27' is closed at the other end as at 28' and has an inflated diameter greater than the maximum dimension of the hole 50, so that when the form 27' is inflated as was described with reference to the embodiments of FIGURES 1, 2, and 3, the form 27' will be forced into pressure engagement with the walls of the cavity 50. It is to be noted that if the cavity 50 is too large for one form 27', then a plurality of such forms 27' can be placed in juxtaposition transversely across the length of the tunnel 50. These forms may then be pumped up simultaneously or sequentially. In any event, because the form (or group of forms) is larger in dimension than the transverse dimensions of the tunnel 50, the form with the cement in it will conform to any irregularities in the surface of the tunnel 50 to provide not only a watertight seal but a friction contact which prevents displacement of the plug under water pressures which might subsequently develop.

It is to be noted that in this embodiment if the diameter of the tunnel 50 is very large, very substantial tensile forces will result in the form 27' where the surfaces of the form 27' do not contact the surfaces of the tunnel 50. Thus, the strength of the fabric should be sufficient to withstand these tensile forces.

When the cement hardens, a concrete plug encased in fabric results which plug closely conforms in the walls of the tunnel and gives a good sealing action. It is to be noted that the concrete plug in the tunnel 50 can be installed even though the tunnel 50 is full of water, either still or flowing or full of a water slurry. In the latter event, as the form 27' inflates it simply pushes the slurry aside.

It is to be further noted that the amount of solids to be employed is exactly determined by the dimensions of the form 27' and no solids are lost into the tunnel 50 during the pumping of the grout with the exception of a minor highly diluted amount which may pass through the pores of the form before the filter bed forms, but in practice it has been found that they are so diluted that any cement therein when it hardens has no strength.

The form 27' may also be inserted into the tunnel by forming an opening intersecting the tunnel 50 as in the embodiment of FIGURES 1, 2, 3.

FIGURES 6-10 show further alternative embodiment of the invention primarily where a tie rod is to be inserted into an opening in the earth.

Figure 6:
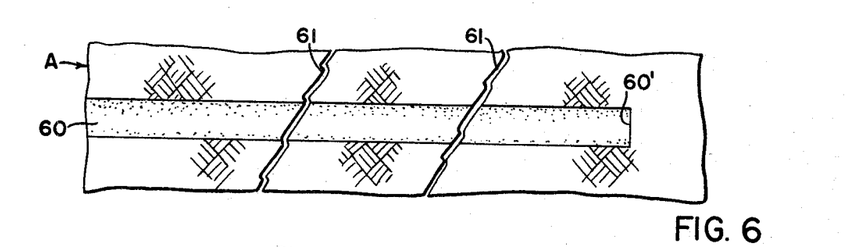
FIGURE 6 is a cross-sectional view of the earth's surface having an opening preformed therein for receiving a tie rod.
Figure 7:
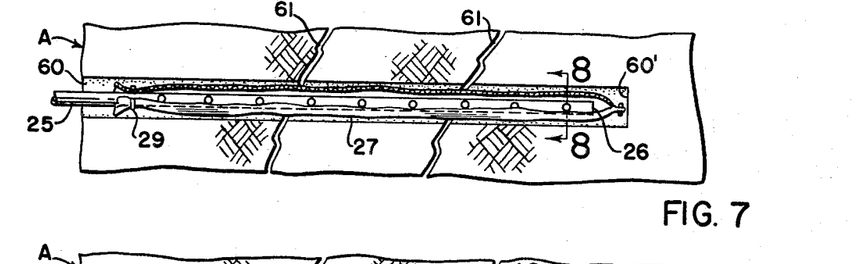
FIGURE 7 is a view similar to FIGURE 6 but showing the grout pipe and tubular form of FIGURE 3 inserted in the opening.

Thus, in FIGURE 6 the earth A has an elongated opening 60 formed therein by any suitable means such as drilling, pile driving or the like. It is to be noted that the passage 60 may have one or more transverse fissures 61 intersecting therewith.

After the opening 60 is formed, a grout pipe 25 with a form 27 therearound as described with reference to FIGURE 2 is inserted into the opening. In this embodiment of the invention, the grout pipe 25 has a length approximately equal to the depth of the opening 60 and its insertion end 26 is inserted in the opening 60 so that the end 26 is spaced from the bottom 60' of the opening 60. Thereafter, grout as described with reference to FIGURES 1-5 is pumped through the pipe 25 into the form 27. Again in this embodiment of the invention, the form 27 has an inflated diameter greater than the diameter of the opening 60. As the form 27 is inflated it presses outwardly against the walls of the opening 60 and thereafter as the pumping continues the water flows outwardly through the walls of the form into the surrounding earth or into the fissures 61. In any event, the water-cement ratio is again lowered so that when the concrete ultimately hardens it will have a maximum strength.

Figures 8, 9, 10:
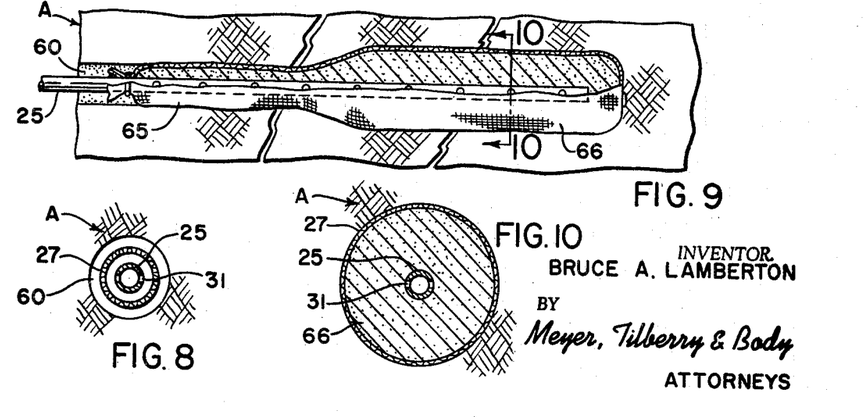
FIGURE 8 is a cross-sectional view of FIGURE 7 taken approximately on the line 8—8 thereof.
FIGURE 9 is a view similar to FIGURE 7 but showing the tubular form inflated.
FIGURE 10 is a cross-sectional view of FIGURE 9 taken approximately on the line 10—10 thereof.

In the embodiment of the invention shown in FIGURE 9 the amount of grout pressure employed is sufficient to bulge the earth A radially outwardly from the opening 60 resulting in a concrete body having a portion 65 adjacent the open end of the opening 60 of approximately the diameter of the opening 60 and another portion 66 remote from the open end of the opening 60 of a diameter greater than the diameter of the opening 60. The concrete thus is in a bulbous form and results in a greater holding force in the earth A than would otherwise be the case. It is to be noted in this respect that if the form 27 were not employed it would have been impossible to have developed sufficient pressure at a point remote from the open end of the opening 60 to bulge the walls of the opening 60 radially outwardly or in the alternative excessive amounts of grout would have flowed radially outwardly into the pores of the soil or into the fissures 61. Using the invention a minimum amount of grout must be pumped and yet a construction is provided having a maximum strength against pull out longitudinally of the hole.

In this embodiment of the invention the grout pipe 25 is employed as a tension member and conventional means not shown are fastened to the exposed end of the grout pipe 25. Solid tension rods could also be employed.

Figure 11:
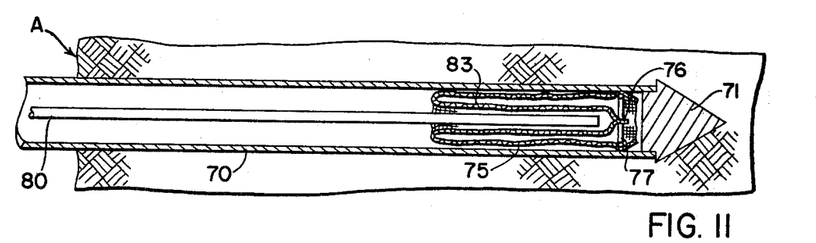
FIGURE 11 is a view similar to FIGURE 7 but showing an alternative embodiment of the invention wherein the grout pipe is also used to form the opening in the earth's surface.
Figure 12:
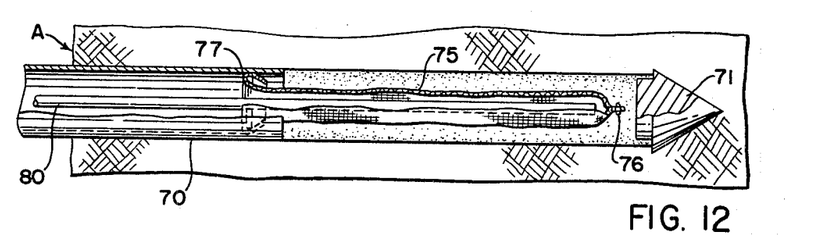
FIGURE 12 is a view similar to FIGURE 11 but showing the grout pipe partly withdrawn and the form ready to be inflated.

FIGURES 11 and 12 show a still further embodiment of the invention wherein the grout pipe itself is employed to form the opening. Thus, in this embodiment of the invention a grout pipe 70 having a diameter equal to the diameter of the desired opening of the earth's surface A is provided. A pointed cap 71 is removably fastened on the insertion end of the grout pipe 70. A tubular form 75 is provided closed at one end as at 76, and with the other end fastened or sealed to the inside of the insertion end of the pipe 70 by means of an expansion ring 77. It will thus be seen that the form 75 is doubled back on itself as at 83 so that the end 76 is adjacent to the opposite end of the tube and the point where the tube is sealed to the grout pipe 70 by means of the seal 77.

A tie rod 80 which in this case can be solid is inserted into the doubled back portion 83 of the form 75 and is adjacent to the closed end of the form 75. This combination is then forced into the earth's surface to the desired depth. When this situation has been reached, the grout pipe 70 is withdrawn a distance equal approximately to the length of the tube 75. As it does so the cap 71 remains in the earth. Thereafter grout is pumped through the grout pipe 70 until the form 75 is fully inflated, the same as described with reference to the embodiments of FIGURES 1, 2 and 3. When the pumped grout has set up, either the grout pipe 70 may be removed by ripping it free from the seal 77 thus exposing the free end of the tie rod 80. Alternatively, the projecting end of the grout pipe 70 can be cut off or a detachable connection not shown may be provided.

The tie rod 80 may have various means not shown for increasing the holding power between itself and the hardened concrete.

Figure 13:
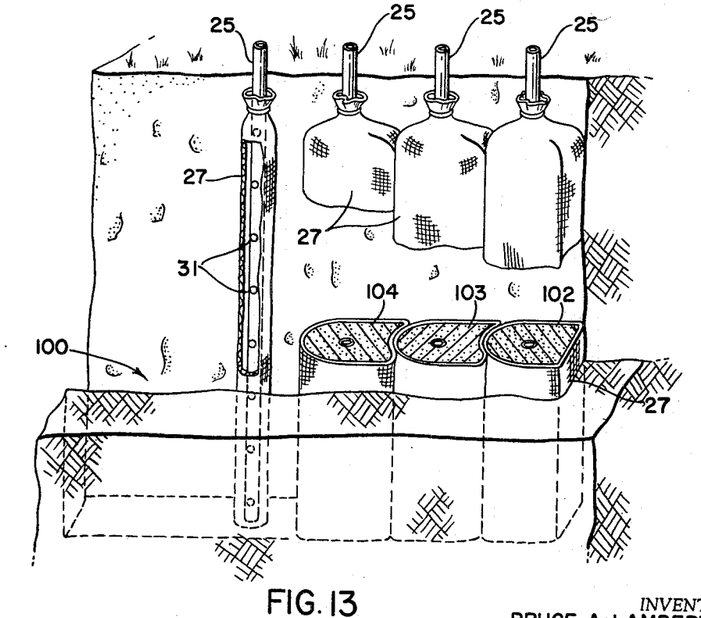
FIGURE 13 is a fragmentary view of the earth's surface showing an elongated trench partly filled with a curtain wall and illustrating another embodiment of the invention.

FIGURE 13 shows a still further alternative embodiment of the invention wherein it is employed for the purpose of forming a curtain wall of concrete columns in the earth's surface. In this embodiment of the invention, an elongated trench 100 is provided to the desired depth of the wall and of a predetermined lateral width. Thereafter a plurality of grout pipes 25 and forms 27 as is shown in FIGURE 2 are inserted in spaced side-by-side relationship into the trench 100. In this embodiment the inflated diameter of the form 27 is preferably greater than the lateral width of the trench 100. One form 27 is then inflated as is shown in FIGURE 13 in the same manner as described with reference to the other embodiments. This operation forms a first concrete column 102. Thereafter a second concrete column 103 is formed in such a manner that its side surfaces are in pressure contact with the surfaces of the column 102. It is to be noted that the form 103 when it is inflated engages the sides of the trench 100 which prevents the column moving longitudinally of the trench so that as the form is continued to be inflated it will engage the surface of the column 102 with some pressure.

Thereafter, a column 104 is placed in position using a similar method.

It is to be noted that the columns 102, 103, can all be inflated simultaneously or sequentially or spaced ones inflated and then intermediate ones inflated.

It will be noted that using this method the lower end of the columns are in pressure engagement with the lower end of the trench 100 and the walls of the columns 102, 103, 104 are in pressure engagement with the walls of the trench.

While the columns 102, 103 104 are shown as having a vertical axis, they can also have a horizontal axis, and in fact the technique described with reference to FIGURE 13 can be used to build a dam across a tunnel by starting at the bottom with a single column and then working upwardly with columns on top thereof. In this instance, the grout pipe would be inserted into the side of the form 27 rather than into the end and the axial length of the form should preferably be of a length which will reach all the way across the tunnel.

It will, of course, be appreciated that if a single vertical hole of a diameter smaller than the diameter of a single form is formed that conventional load bearing columns may be formed in the earth's surface.

Figure 14:
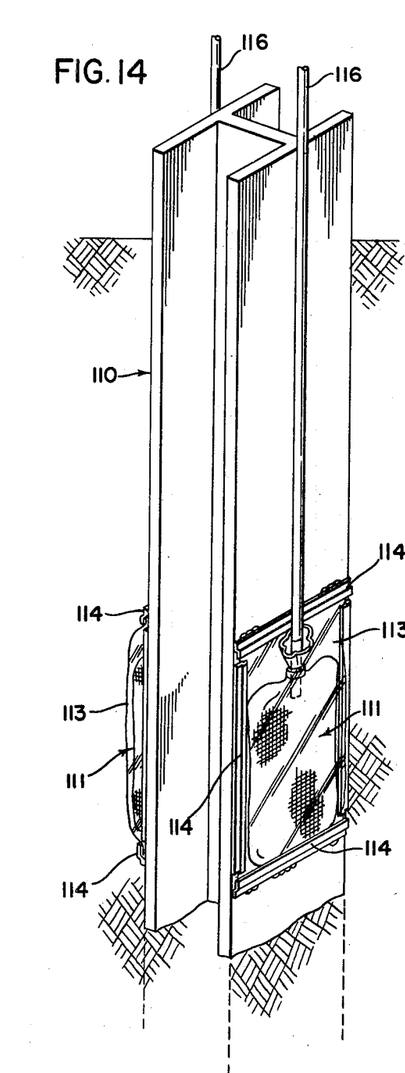
FIGURES 14 and 15 are fragmentary views of a pile in the earth's surface with a flexible tubular form fixed thereto illustrating a still alternative form of the invention.
Figure 15:
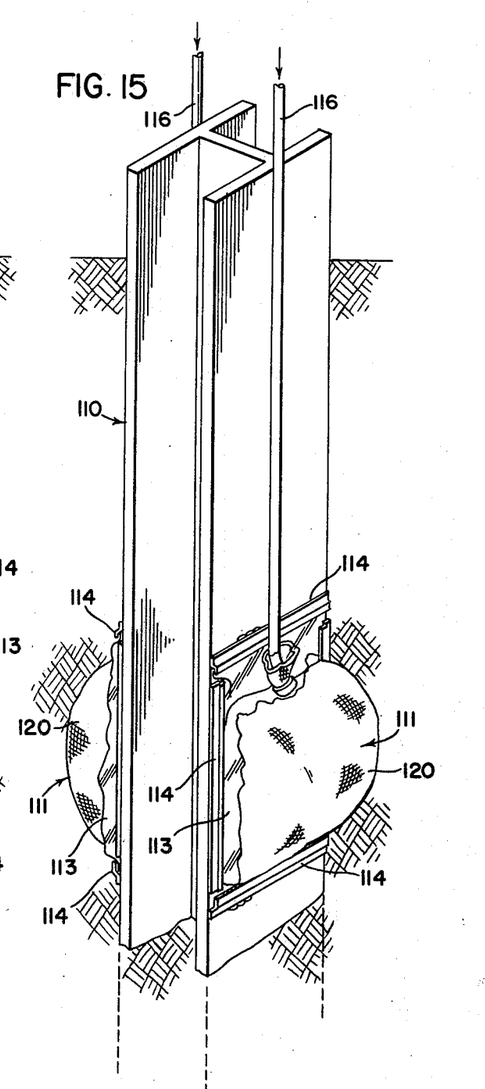

FIGURES 14 and 15 illustrate a further embodiment of the invention wherein it is employed for increasing the bearing capacity of a driven steel H pile 110. Porous fabric bags 111 are securely attached to opposite flanges of the steel H pile 110 at locations such that when the pile 110 is driven into final position in the earth, the fabric bags 111 will be located at a point where improved skin friction or bearing capacity is desired. This point may be at the lower tip of the pile or at some point along its length, as shown in FIGURES 14 and 15. During the driving of the steel H pile, the fabric bag 111 is protected by a light shielding member such as sheet plastic cover plate 113 held in place by brackets 114.

When the pile 110 is driven to its desired location, grout 25 is injected through the injection pipes 116 at sufficient pressure to displace the cover plate 113 and fill the fabric bags 111, displacing the adjoining earth. Additional pressure is then applied to force the water of the grout through the porous fabric, lowering the water-cement ratio as described above. An enlargement 120 of the pile cross section is thus formed as shown in FIGURE 15 which increases the bearing or skin friction at the point desired.

The invention has been described with reference to a gout containing no aggregate. Obviously aggregate may be employed. Alternatively reinforcing fibers such as chopped nylon or glass fibers may be mixed in with the grout and pumped into the form. Such fibers give strength to the hardened concrete. Each strand may have a length of from 1 to 6 inches preferably approximately 2 inches and the total weight of the fibers should be on the order of ½ to 3% of the weight of the cement.

In all instances of the embodiments of the invention shown a highly flowable grout is pumped into a porous fabric form. The pumping is continued until a pressure develops and this pressure is maintained for a period of time and of a sufficient value to force the water of the grout outwardly through the pores of the form while the size of the pores is sufficiently small to cause a filter bed to build up and prevent the passage of any particles therethrough. In this manner the water-cement ratio is reduced. The grout, when it sets up, is under pressure either from the pump or from the tension in the strands of the form so that a concrete of maximum density and maximum strength results.

In all instances all the grouts employed go into a closed form. None is wasted in fissures, cracks, voids or porous soil and there is no problem of dilution of the grout by water either still or flowing. In fact, columns can easily be formed in open water. Further it is to be noted that the flexible fabric form is readily put in place and held there until filled by the long rigid grout pipe extending the length of the form.

The invention has been described with reference to preferred embodiments. Obviously modifications and alterations will occur to others upon a reading and understanding of this specification and it is my intention to include such modifications and alterations insofar as they come within the scope of the appended claims.

Having thus described my invention I claim:

1. The method of forming concrete columns in a cavity in the earth's surface comprising the steps of:
   forming an opening of a predetermined diameter in said surface and intersecting with said cavity;
   providing an elongated form of flexible porous material having an inflated diameter greater than the diameter of said opening and a length greater than the dimension of said cavity on the axis of said opening, said form being sealed closed at its lower end and having a grout pipe extending thereinto;
   inserting said form through said opening into said cavity a distance such that one end of said form is adjacent to the side of the cavity remote from said opening and the other end is at least in said opening;
   pumping a cementitious grout into said form through said grout pipe to inflate said form so that the end of said form in said opening bears against the walls thereof and the end of the form in the cavity bears against the walls of the cavity both around said opening and against the opposite wall of said cavity;
   continuing such pumping until a substantial amount of substantially only water of said grout has passed outwardly through the walls of said form thereby reducing the water-cement ratio of the grout in the form; and
   allowing the grout to harden into a concrete.

2. The method of claim 1 wherein:
   said grout pipe is inserted into said form through one end thereof and the portion of said pipe in said form is approximately the length of said form; and
   said pipe is used to force said form through said opening into the cavity.

3. The method of claim 2 wherein:
   said portion of said pipe in said form has a plurality of openings therethrough.

4. The method of claim 1 wherein:
   said grout has a water-cement ratio in excess of 0.45; and, said pumping is continued until the water-cement ratio adjacent to said form is reduced to below 0.35.

5. The method of claim 1 wherein:
   there are a plurality of adjacent cavities in the earth's surface and said method includes the additional steps of;
   forming aligned openings in the earth's surface intersecting with all of said cavities and,
   said form has a length sufficient to reach from the bottom of the lowermost cavity into the opening above the uppermost cavity whereby concrete columns can be formed simultaneously in all of said cavities bearing against the walls thereof.

6. The method of claim 1 which includes the steps of:
   forming a plurality of parallel openings spaced from each other a distance less than the diameter of said form when inflated; and,
   inserting forms through all of said openings;
   pumping grout into all of said forms whereby to form a continuous wall in said cavity.

7. The method of sealing an elongated cavity of a predetermined transverse dimension under the earth's surface comprising the steps of:
   providing a tubular form of flexible porous fabric material closed at its lower end having an inflated dimension greater than the transverse dimension of said cavity and having a grout pipe extending thereinto;
   placing said form in said cavity;
   pumping a cementitious grout into said form until the form is inflated and in pressure bearing relationship with the walls of said cavity;
   continuing the pumping of said grout until a filter bed builds up in the form and substantially only water of the grout passes outwardly through the filter bed and the walls of the form and the water-cement ratio of the grout in the form has been reduced; and allowing the cement to harden into concrete.

8. The method of claim 7 wherein said cavity has a transverse dimension greater than the transverse dimension of said form including the additional step of placing a plurality of such forms side-by-side on the transverse dimension of said cavity; and,
   inflating said forms simultaneously with a cementitious grout.

9. The method of claim 7 wherein the transverse dimensions of the cavity are greater than the diameter of an individual form which includes the additional step of:
   placing a plurality of such forms in transverse relationship across said cavity and sequentially inflating said forms with a cementitious grout.

10. The method of installing a tie rod in an elongated opening in the earth's surface comprising the steps of:
    providing an elongated tie rod having an end adapted to be inserted into said opening and the opposite end to be exposed;
    enclosing the insertion end in an elongated tubular form of flexible porous material; said form being sealed closed at its lower end,
    inserting said tie rod and form into said opening, pumping a cementitious grout into said form until said form is inflated and bears against the walls of said opening;

continuing the pumping until only generally clear water from the grout passes outwardly through the pores of the form and the water-cement ratio of the grout has decreased; and, allowing the grout to harden into concrete.

11. The method of claim 10 wherein said tie rod is also a grout pipe.

12. The method of claim 10 wherein both a tie rod and grout pipe extend into said form.

13. The method of claim 10 wherein the pumping is continued until sufficient pressure is created to force the walls of the opening radially whereby a bulbous concrete body results.

14. The method of forming structures in the earth's surface providing the steps of:

providing an opening in the earth's surface of the desired depth and length of said structure;

providing a plurality of elongated tubular flexible fabric porous forms each of the length equal to the desired depth of said structure and of a predetermined inflated diameter;

positioning a first form in said opening;

pumping a cementitious grout thereinto until fully inflated;

continuing the pumping until substantially only water of said grout has passed outwardly through the walls of said form and the water-cement ratio of the grout in the form has been reduced;

positioning a second form in close spaced relationship to said first form; and repeating the steps of pumping a cementitious grout thereinto and reducing the water-cement ratio of the grout;

positioning a third form in close spaced relationship to said second form; and repeating the steps of pumping a cementitious grout thereinto and reducing the water-cement ratio of the grout and repeating the placing of said forms until the structure is completed.

15. The method of claim 14 wherein said forms are placed in said openings simultaneously and are inflated simultaneously.

16. The method of claim 14 wherein said forms are placed in said openings in substantially spaced relationship and are inflated and then other forms are placed between said spaced inflated forms and are inflated until all of said inflated forms are in side-by-side pressure engagement.

17. The method of claim 14 wherein said opening has a width less than the diameter of said inflated forms.

18. The method of forming a bearing member in the earth's surface comprising the steps of:

(a) forming an opening of a predetermined diameter in said surface;

(b) providing an elongated tube of flexible porous material having a diameter greater than said opening and having a grout pipe extending thereinto;

(c) inserting said form into said opening;

(d) pumping a cementitious grout into said form through said grout pipe to inflate said form so that said form bears against the walls of said opening;

(e) continuing such pumping until a substantial amount of substantially only water of said grout has passed outwardly through the walls of said form thereby reducing the water-cement ratio of the grout;

(f) allowing the grout to harden into concrete.

19. The method of claim 18 wherein:

said form and said grout pipe are conveyed into said opening by the member used to form the opening.

20. A method of increasing the bearing capacity of driven piles comprising the steps of:

providing an elongated rigid pile;

providing a closed porous form;

securing the form to said pile adjacent to the lower end thereof;

inserting a grout pipe into said form with the grout pipe extending upward along the length of the pile;

driving said pile into the earth's surface; and inflating said form by pumping a readily flowable cementitious grout through said grout pipe into said form and continuing such pumping after said form has been inflated until a substantial amount of substantially only water in said grout has passed outwardly through the porous walls of the form thereby reducing the water-cement ratio of the grout in the form.

References Cited

UNITED STATES PATENTS

| | | | |
|---|---|---|---|
| Re. 25,614 | 7/1964 | Turzillo | 61—35 |
| 961,492 | 6/1910 | Goldsborough | 61—53.6 |
| 1,421,857 | 7/1922 | Store | 61—46 |
| 2,497,377 | 2/1950 | Swann et al. | 61—53.6 |
| 2,708,973 | 5/1955 | Twining | 166—22 |
| 3,197,964 | 8/1965 | Fehlmann et al. | 61—35 |
| 3,301,329 | 1/1967 | Martin | 166—117 X |
| 3,345,824 | 10/1967 | Turzillo | 61—35 |

JACOB SHAPIRO, Primary Examiner

U.S. Cl. X.R.

61—46, 53.6, 53.52; 166—117